United States Patent
Mu et al.

(10) Patent No.: US 8,102,593 B2
(45) Date of Patent: Jan. 24, 2012

(54) QUASI NON-CRITICAL PHASE MATCHED AND CONTRA-PHASE MATCHED STRUCTURES

(75) Inventors: Xiaodong Mu, Sunnyvale, CA (US); Helmuth E. Meissner, Pleasanton, CA (US); Huai-Chuan Lee, Albany, CA (US)

(73) Assignee: Onyx Optics, Inc., Dublin, CA (US)

( * ) Notice: Subject to any disclaimer, the term of this patent is extended or adjusted under 35 U.S.C. 154(b) by 0 days.

(21) Appl. No.: 12/789,273

(22) Filed: May 27, 2010

(65) Prior Publication Data

US 2011/0013264 A1    Jan. 20, 2011

Related U.S. Application Data

(60) Continuation-in-part of application No. 12/359,145, filed on Jan. 23, 2009, now abandoned, which is a division of application No. 11/891,016, filed on Aug. 7, 2007, now abandoned.

(60) Provisional application No. 61/181,599, filed on May 27, 2009.

(51) Int. Cl.
*G02F 1/35* (2006.01)
*G02F 2/02* (2006.01)

(52) U.S. Cl. .................. 359/326; 385/122; 359/328

(58) Field of Classification Search .......... 359/326–332; 372/21–22; 385/122

See application file for complete search history.

(56) References Cited

U.S. PATENT DOCUMENTS

| | | | |
|---|---|---|---|
| 3,949,323 A | 4/1976 | Bierlein et al. | |
| 4,826,283 A | 5/1989 | Chuangtian et al. | |
| 5,047,668 A * | 9/1991 | Bosenberg | 359/330 |
| 5,117,126 A * | 5/1992 | Geiger | 359/330 |
| 5,315,433 A * | 5/1994 | Okazaki et al. | 359/328 |
| 5,846,638 A | 12/1998 | Meissner | |
| 5,852,622 A | 12/1998 | Meissner et al. | |
| 6,025,060 A | 2/2000 | Meissner | |
| 6,137,624 A * | 10/2000 | Taira | 359/326 |
| 6,522,402 B1 | 2/2003 | Wang et al. | |
| 6,544,330 B2 * | 4/2003 | Ebbers | 117/2 |
| 6,785,041 B1 * | 8/2004 | Vodopyanov | 359/330 |
| 6,807,200 B2 * | 10/2004 | Phua et al. | 372/21 |
| 7,286,282 B2 * | 10/2007 | Kojima et al. | 359/326 |
| 7,457,330 B2 | 11/2008 | Luo et al. | |
| 2007/0297033 A1 * | 12/2007 | Kelley | 359/33 |
| 2009/0040596 A1 | 2/2009 | Mizuuchi et al. | |

OTHER PUBLICATIONS

Armstrong, D.J. et al., "Parametric amplification and oscillation with walkoff-compensating crystals," *J. Optical Society of America B*, Feb. 1997, vol. 14, No. 2, pp. 460-474.

(Continued)

*Primary Examiner* — Daniel Petkovsek
(74) *Attorney, Agent, or Firm* — Kilpatrick Townsend & Stockton LLP; Gerald T. Gray (57) ABSTRACT

Adhesive-free bond non-linear optical (NLO) components, devices and systems including one or more engineered quasi non-critical phase matched or contra-phase matched NLO crystal doublets. Such systems and devices advantageously increase the efficiency of NLO frequency conversion and improve beam quality. Devices are applicable to any uniaxial and biaxial NLO crystals in a wide range of wavelengths, e.g., from far ultraviolet to visible to far infrared. Devices employing engineered AFB NLO components according to certain embodiments include any conventional frequency converting architectures. Systems and methods are also provided to unambiguously determine and correct walk-off for any arbitrary uniaxial and biaxial crystal orientation.

9 Claims, 8 Drawing Sheets

OTHER PUBLICATIONS

Bréhat, F. et al., "Calculation of double-refraction walk-off angle along the phase-matching directions in non-linear biaxial crystals," *J. Phys. B At. Mol. Opt. Phys.*, 1989, vol. 22, pp. 1891-1898.

Carrasco, S. et al., "Observation of self-trapping of light in walk-off compensating tandems," *Optical Letters*, Feb. 15, 2004, vol. 29, No. 4, pp. 382-384.

Cheung, E. et al., "High Power Conversion to Mid-IR Using KTP and ZDP OPOs," *Advances Solid State Laser, Technical Digest (Optical Society of America, Washington, D.C.)*, 1999, pp. 358-361.

Friebe, J. et al., "β-$BaB_2O_4$ deep UV monolithic walk-off compensating tandem," *Optics Communications*, 2006, vol. 261, pp. 300-309.

Koechner, W., *Solid-State Laser Engineering, Second and Completely Revised and Updated Edition*, 1988, K. Shimoda et al., (eds.), Springer-Verlag: Berlin, Germany, Table of Contents only, 6 pages.

Serkland, D.K. et al., "Continuous-wave total-internal reflection optical parametric oscillator pumped at 1064 nm," *Optics Letters*, Jul. 15, 1994, vol. 19, No. 14, pp. 1046-1048.

Smith, A.V. et al., "Increased acceptance bandwidths in optical frequency conversion by use of multiple walk-off-compensating nonlinear crystals," *Journal Optical Society of America B*, Jan. 1998, vol. 15, No. 1, pp. 122-141.

Sutherland, R.L., *Handbook of Nonlinear Optics*, Marcel Dekker, Inc.: New York, NY, 1996, Table of Contents (4 pages) and p. 86.

Wu, R. et al., "High power diffusion bonded walk-off compensated KTP OPO," *Proceedings of SPIE*, 2001, vol. 4595, pp. 116-123.

Zondy, J-J. et al., "Second-harmonic generation with monolithic walk-off compensating periodic structures. II. Experiments," *Journal of the Optical Society of America B*, Aug. 2003, vol. 20, No. 8, pp. 1695-1707.

Zondy, J-J. et al., "Second-harmonic generation with monolithic walk-off compensating periodic structures. I. Theory," *Journal Optical Society of America B*, Aug. 2003, vol. 20, No. 8, pp. 1675-1694.

\* cited by examiner

Single KTP crystal

FIG. 4

Bonding interface

FIG. 4A

Bonding interface

QUASI NON-CRITICAL PHASE MATCHED AND CONTRA-PHASE MATCHED STRUCTURES

CROSS-REFERENCES TO RELATED APPLICATIONS

This application is a continuation-in-part of U.S. patent application Ser. No. 12/359,145, filed Jan. 23, 2009 now abandoned, which is a divisional of U.S. patent application Ser. No. 11/891,016, filed Aug. 7, 2007 now abandoned. This application also claims the benefit of U.S. Provisional Application Ser. No. 61/181,599, filed May 27, 2009, entitled "QUASI-NON-CRITICAL PHASE MATCHED STRUCTURES" which are hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable

BACKGROUND

The present invention relates in general to nonlinear optical components and devices, and to lasers and more particularly to laser equipment in which the fundamental wavelength of an input laser energy of a solid state or gas or vapor laser is converted to different output wavelengths using nonlinear optical crystal components.

Laser systems are widely used in applications that include materials processing, tissue treatment and surgery, spectroscopy and defense applications. Laser systems operating at various fundamental wavelengths are advantageous for different types of operations in the following fields of use and others: materials processing, medical treatment and surgery, spectroscopy, defense, and scientific applications.

Different radiation wavelengths are desired for different applications. The radiation spectrum of most solid state lasers is relatively narrow with radiation output peaks occurring at fairly defined wavelengths. Output at the fundamental wavelength of a solid state laser oscillator is restricted by the availability of crystal and glass lasing media that are doped with available dopant ions.

Methods currently exist for generating additional wavelengths by converting the wavelength of a fundamental laser output to different wavelengths.

One technique for generating an output radiation beam having a different wavelength than that generated by the lasing medium is by the use of nonlinear frequency conversion crystals. Specialized nonlinear optical (NLO) crystals have been developed for use with currently available lasing media to provide an output wavelength different from the characteristic wavelength generated by the lasing medium itself. For example, U.S. Pat. Nos. 3,949,323 and 4,826,283, which are hereby incorporated by reference, disclose techniques for fabricating a harmonic crystal for use with lasing media where the crystal is responsive to an input fundamental wavelength to produce an output harmonic wavelength. Crystals useful for frequency conversion include the following types: Potassium titanyl phosphate (KTP or $KTiOPO_4$), Lithium triborate (LBO or $LiB_3O_5$), Beta-barium borate (BBO), Potassium titanyl arsenate (KTA) and similar derivatives of KTP, lithium niobate ($LiNbO_3$) and magnesium-doped $LiNbO_3$ ($MgO:LiNbO_3$), Lithium iodate ($LiIO_3$), $KNbO_3$, Zinc germanium phosphide (ZGP, $ZnGeP_2$), silver gallium selenide ($AgGaSe_2$, AGSe) and others. A more complete discussion of nonlinear devices and crystals used in such devices can be found in W. Koechner, Solid-State Laser Engineering (2d ed. 1988) and R. L. Sutherland, Handbook of Nonlinear Optics) 1996.

In anisotropic crystal, the direction of wave vector for an extra-ordinary wave is not generally the same as the direction of the beam propagation (Poynting vector). The extraordinary beam is said to walk-off the axis of the wave vector direction. Therefore, the ordinary and extraordinary beams of finite size will not completely overlap over the full length of a non-linear optical (NLO) crystal. The angle ρ is called the walk-off angle and can be of the order of a few degrees. The efficiency of critically phase-matched frequency conversion is strongly dependent on walk-off because beams that do not physically overlap cannot interact. Large walk-off angle can also affect the output beam quality.

When lights propagate along one of the principle axes of a NLO crystal, walk-off is vanished. Phase-matching along principle axis is possible for NLO frequency conversion at a certain laser wavelength, this is called 90°-phase matched or non-critically phase matched (NCPM) frequency conversion. 90°-phase matched (or NCPM) frequency conversions have the advantages of (i) Zero spatial walk-off between the ordinary and extraordinary polarized laser beams, therefore, long crystal might be used in the frequency conversion process for high conversion efficiency; (ii) Large angular acceptance, therefore, insensitive to angle misalignment or tight focused laser beam might be used.

Due to the above advantages, non-critical phase matching is an ideal phase matching condition for NLO frequency conversion. However, limited by nature, most of the NLO frequency conversions need to be critical phase matched, only at particular wavelengths non-critical phase matching might happen in some of the NLO crystals.

Accordingly, it is desirable to provide optical components and devices that overcome the above and other problems.

BRIEF SUMMARY

Embodiments of the present invention enable the engineered design of adhesive-free bond NLO crystal components transfer critical phase match to quasi non-critical phase match (QNCPM) for all useful wavelengths. Such components typically provide all the similar features of a non-critical phase matched frequency conversion, such as (1) Thoroughly compensated spatial walk-off; (2) Enlarged angular acceptance; (3) Temperature tuning for phase matching wavelengths. Based on the relative alignment of the second crystal to the first crystal, contra-phase matched structures can be designed. (In previous publications, this is called adhesive-free bond quasi-phase matching (AFB QPM). In order to distinguish from the conversional QPM frequency conversions from periodically poled LiNbO3 or KTP crystals, we used contra-phase match in this article). The contra-phase match has opposite polarity of the effective nonlinear optical coefficient in the adjacent crystals of the NLO composite for the original critical phase matched wavelengths, it can split the original phase matching wavelength into two or more QPM wavelengths. The light wavelength (or frequency) separation is dependent on the single crystal length that used in the AFB NLO composites and therefore, can be designed based on practical application. One example application of this structure is contra-phase matched dual-wavelength optical parametric oscillation (OPO), in which two signal (and two idler) wavelengths can be achieved and the frequency separation of the two signal (or two idler) lights can be designed in terahertz (THz) range. Consequently, THz radiation based on outracavity or intracavity difference-frequency generation (DFG) or photomixing can be achieved by using the contra-phase matched dual-wavelength OPO as a pump source.

Although present NLO composites of quasi-non-critical phase matched and contra-phase matched structures have thoroughly compensated spatial walk-off, different from the previous walk-off corrected (WOC) NLO crystals for frequency conversion in laser systems have been reported in the literature [see, e.g., references 1, 2, 3, 4, 5, 6, 7 included in Appendix A, each of which is hereby incorporated by reference], and U.S. Pat. No. 6,544,330 that uses diffusion bonded structures according to U.S. Pat. Nos. 5,846,638; 5,852,622; and 6,025,060 (all of which are hereby incorporated by reference), the present invention mainly focus on the polarity alignment of the effective nonlinear coefficients in the NLO composite. As a result, novel phase-match structures and applications have been discovered. Scientific background information, experimental verification capabilities and fabrication techniques are provided herein. Embodiments of the present invention are applicable to any uniaxial and biaxial NLO crystals in a wide range of wavelengths, e.g., from far ultraviolet to visible to far infrared. Devices employing engineered AFB NLO components according to embodiments of the present invention include any conventional frequency converting architectures.

Systems and methods are provided to unambiguously determine and correct walk-off for any arbitrary uniaxial and biaxial crystal orientation. The correct crystal orientation is also experimentally confirmed.

The present invention allows for the optimization of the length of each crystal pair for a given beam diameter and walk-off angle.

Engineered composites of the present invention result in a predictable high conversion efficiency that is dependent on parameters that include beam diameter, crystal orientation, walk-off angle, length of individual crystals, number of crystal pairs, pump beam wavelength and desired output wavelength. High power operation is facilitated by the high conversion efficiency. A decrease in laser damage is another result of the present invention because only a lower input power is required to reach a desired output power at a frequency-converted wavelength. Another benefit of the high conversion efficiency is the high beam quality of the output beam.

Another very attractive benefit of the present invention is the broadband output of an engineered WOC NLO composite that includes differently cut and oriented crystals corresponding to a range of output wavelengths without any tuning requirements. This device can act as spectrometer that can measure absorption of organic or inorganic species in fluids or gases.

The present invention enables the output of different distinctive wavelengths by combining WOC NLO crystals of different cuts corresponding to different phase matching angles into one or a number of components through which the pump beam and the converted beam propagate.

To mitigate laser damage at the input and output faces of the component, frequency conversion-inactive ends can be affixed to them. It is desirable but not required to have a matching refractive index between the inactive end sections and the active component. The interface between the ends and the active component may be coated with an antireflective coating to alleviate any differences in refractive index.

The present invention also includes devices that are based on the novel NLO crystal assemblies of the present invention as add-ons to existing gas, vapor or solid state lasers or as new laser devices that efficiently convert an input wavelength into one or more output laser wavelengths. While any conventional laser pump sources may be used (don't know the exactly meaning)

The present invention also is applicable to walk-off correction of uniaxial and biaxial frequency-conversion-inactive crystals that are cut at arbitrary crystal angles. This may be useful for special crystal optics that are cut at arbitrary crystallographic orientations and laser components.

According to one embodiment, a quasi non-critically phase matched optical assembly for frequency conversion of an input radiation beam is provided that typically includes at least one walk-off corrected pair of critically phase matched nonlinear optical crystals, wherein the crystals are cut or otherwise formed such that i) each optical crystal has a pair of parallel opposing end faces, ii) the crystals each have the same length between end faces, and iii) an orientation of the optical axis relative to an end face of each crystal is the same for all crystals. In certain aspects, the walk-off corrected pair of the critically phase matched nonlinear optical crystals is also aligned with the same polarity of the effective nonlinear coefficient. In certain aspects, each optical crystal is a frequency-converting uniaxial crystal. In certain aspects the uniaxial crystal is selected from the group consisting of ZGP (ZnGeP2), $\beta$-BaB$_2$O$_4$, CsLiB$_6$O$_{10}$, LiNbO$_3$, MgO:LiNbO$_3$, AgGaS$_2$, and AgGaSe$_2$. In certain aspects, each optical crystal is a frequency-converting biaxial crystal. In certain aspects the biaxial crystal is selected from the group consisting of KTP, (KTiPO$_4$), LiB$_3$O$_5$, KNbO$_3$, CsB$_3$O$_5$, BiB$_3$O$_6$, CsTiOAsO$_4$, and RbTiOAsO$_4$.

According to one embodiment, a contra-phase matched optical assembly for frequency conversion of an input radiation beam is provided that typically includes at least one walk-off corrected pair of critically phase matched nonlinear optical crystals, wherein the crystals are cut or otherwise formed such that i) each optical crystal has a pair of parallel opposing end faces, ii) the crystals each have the same length between end faces, and iii) an orientation of the optical axis relative to an end face of each crystal is the same for all crystals. In certain aspects, the walk-off corrected pair of the critically phase matched nonlinear optical crystals is also aligned with the opposite polarity of the effective nonlinear coefficients in the WOC crystal pair. In certain aspects, each optical crystal is a frequency-converting uniaxial crystal. In certain aspects the uniaxial crystal is selected from the group consisting of ZGP (ZnGeP2), $\beta$-BaB$_2$O$_4$, CsLiB$_6$O$_{10}$, LiNbO$_3$, MgO:LiNbO$_3$, AgGaS$_2$, and AgGaSe$_2$. In certain aspects, each optical crystal is a frequency-converting biaxial crystal. In certain aspects the biaxial crystal is selected from the group consisting of KTP, (KTiPO$_4$), LiB$_3$O$_5$, KNbO$_3$, CsB$_3$O$_5$, BiB$_3$O$_6$, CsTiOAsO$_4$, and RbTiOAsO$_4$.

In certain embodiments, contra-phase matched dual-wavelength or multiple-wavelength OPO at any pump wavelength and output wavelengths are provided by using the embodiments of contra-phase matched structures described herein. In certain aspects, THz radiation based on contra-phase matched OPO setup through difference-frequency generation, photomixing and other methods are provided.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF DRAWINGS

FIG. 9 shows the OPO spectrum measured in FIG. 9A Sample 2, and FIG. 9B Sample 1 (red curves). The blue curves are the theoretical gain curves for sample 1 and 2 with the KTP θ angles of 50.69°. In the calculation, 15 layers are used for sample 2 with a QPM-like period of 3 layers. The gray curve in FIG. 3A is the theoretical curve for the 16-layer WPM-like OPO with a period of 2 layers.

DETAILED DESCRIPTION

The present invention provides adhesive-free bond nonlinear optical (NLO) components, devices and systems including one or more engineered quasi non-critical phase matched or contra-phase matched NLO crystal doublets. Such systems and devices advantageously increase the efficiency of all types of NLO frequency conversions, such as, sum-frequency generation (SFG), difference-frequency generation (DFG), optical parametric amplification (OPA), optical parametric oscillation (OPO), second-harmonic generation (SHG), third-harmonic generation (THG), fourth-harmonic generation (FHG) and other high order harmonic generations. Devices are applicable to any uniaxial and biaxial NLO crystals in a wide range of wavelengths, e.g., from far ultraviolet to visible to far infrared. Devices employing engineered NLO components according to embodiments of the present invention include any conventional frequency converting architectures. Systems and methods are also provided to unambiguously determine and correct walk-off for any arbitrary uniaxial and biaxial crystal orientation. This allows the use of WOC crystal doublet assemblies for a wide range of wavelengths and NLO crystals that until now have not been used because of phase matching condition that cannot be achieved in the single crystal due to the nature of the NLO crystals.

QNCPM

Figure 1:
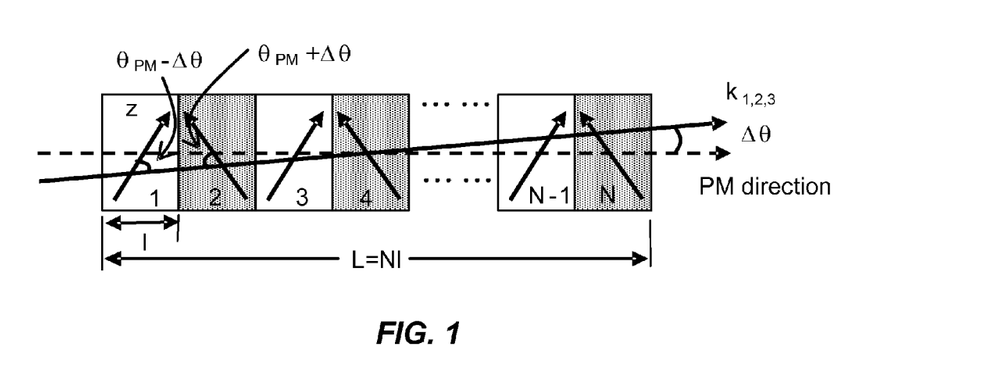
FIG. 1 shows a 16 layer KTP composite for Nd:YAG pumped OPO. N=16 is the bonding number; l=2 mm is the thickness of a single KTP layer.

Now consider a 1.064-μm Nd:YAG laser pumped type-II OPO with signal and idler wavelengths of 2.05 and 2.21 μm, respectively (1064 nm (o)→2050 nm (e)+2212 nm (o)). For a single KTP crystal, according to the Sellmeier equations listed in Ref. [11], the phase-matching angle in the x-z plane is calculated to be $\theta_{PM}=50.6°$ and walk-off angle is 2.68° for the e-polarized signal beam, which corresponds to a spatial walk-off distance of 1.5 mm in a 32-mm long single KTP crystal. In order to reduce the OPO threshold to microjoules/pulse, a single KTP crystal oriented at θ=50.6° and φ=0° was cut into 16 disks with equal disk thickness of 2 mm and cross section 5×12.5 mm². As shown in FIG. 1, the 16 disks were then adhesive-free bonded together in a such way that the adjacent disks always have opposite z-directions with respect to the light propagating direction. A detailed discussion about the bonding configurations will be presented in Section 3.2. the 16-layer KTP composite. Assuming that the pump beam is incident to the crystal at an angle deviation of Δθ to the phase-matching direction (the crystal normal direction) as shown in FIG. 1, the incident angles with respect to the crystal z-axes in the adjacent layers then will be $\theta_{PM}+\Delta\theta$ and $\theta_{PM}-\Delta\theta$ with corresponding phase-mismatching of $\Delta k_1$ and $\Delta k_2$, respectively. Following the general discussions in Ref [12], the amplitude of the DFG field $A_3$ can be derived as:

$$A_3 = \frac{4\pi d_{eff} A_1 A_2}{n_3 \lambda_3} \left[ \frac{1}{\Delta k_1}(e^{i\Delta k_1 l} - 1) \sum_{n=1,3,5,...}^{N-1} e^{\frac{n-1}{2}i(\Delta k_1 + \Delta k_2)l} + \frac{1}{\Delta k_2}(e^{i(\Delta k_1 + \Delta k_2)l} - e^{i\Delta k_2 l}) \sum_{n=2,4,6,...}^{N} e^{\frac{n-2}{2}i(\Delta k_1 + \Delta k_2)l} \right]. \quad (1)$$

Figure 2:
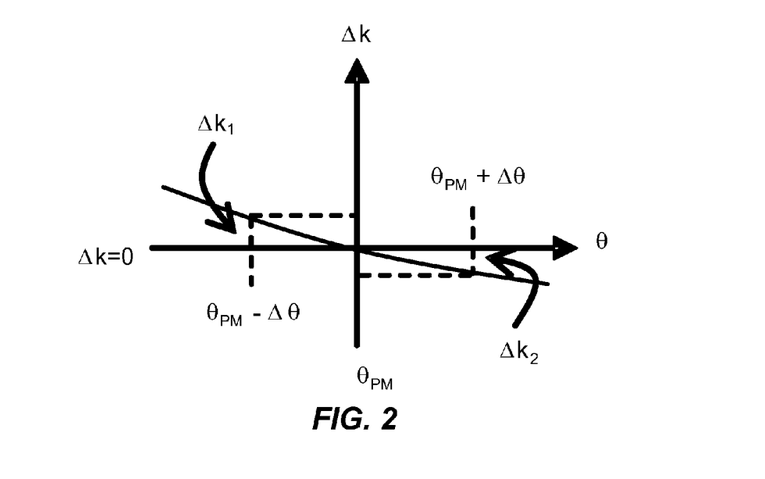
FIG. 2 shows phase-mismatching in adjacent KTP bonding layers.

Since for critical phase-matching we have $\Delta k(\theta_{PM})=k_1-k_2-k_3=0$ while $\delta\Delta k(\theta)/\partial\theta_{PM}\neq 0$, when Δθ approaches to 0, we can have $\Delta k_1 \approx -\Delta k_2 \approx \Delta k \approx \delta\Delta k(\theta)/\partial\theta_{PM}\cdot\Delta\theta$ as shown in FIG. 2. One can see that the phase-mismatching in adjacent KTP crystals will compensate each other and the total phase-mismatching will be close to zero after the laser beams pass through the whole device. Under such approximation and assuming all of the crystal components have the same sign for the effective nonlinear coefficient $d_{eff}$, the DFG output power derived from Eq. (1) can be written as:

$$p_3 \approx \frac{8\pi^2 d_{eff}^2 L^2 P_1 P_2}{\varepsilon_0 c n_1 n_2 n_3 \lambda_3^2 A} \frac{\sin^2(\Delta kl/2)}{(\Delta kl/2)^2}. \quad (2)$$

One can see that Eq. (2) is quite similar to the DFG output power in a single crystal except that in the phase term the total crystal length L is replaced by the KTP disk length l [12].

Figure 3A:
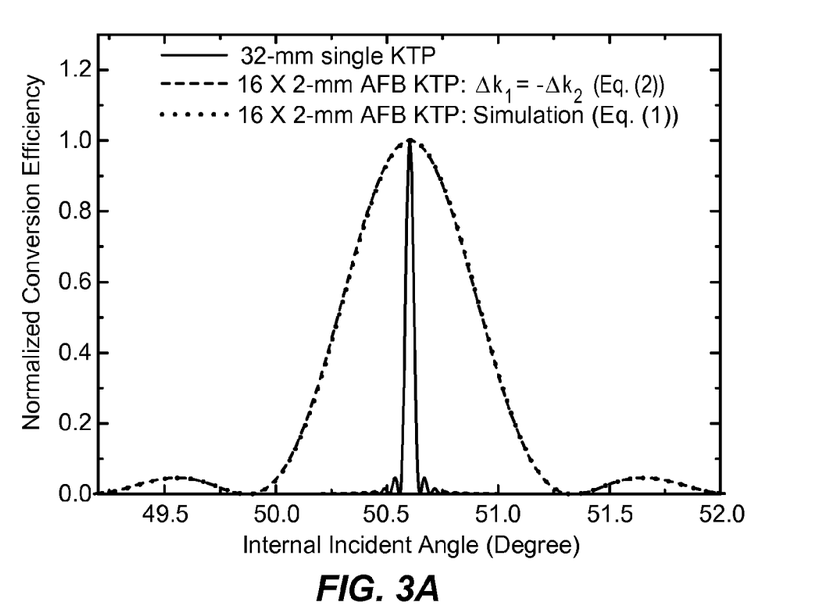
FIG. 3A shows normalized DFG conversion efficiency as a function of incident angle. The blue curve is calculated for a 32-mm single KTP crystal. The red curve that is covered by the green curve is calculated from Eq. (2) with the assumption of $\Delta k_1 = -\Delta k_2 = \Delta k$ for the 16-layer KTP composite. The green curve is the simulation based on the real phase-mismatching in each KTP layer.
Figure 3B:
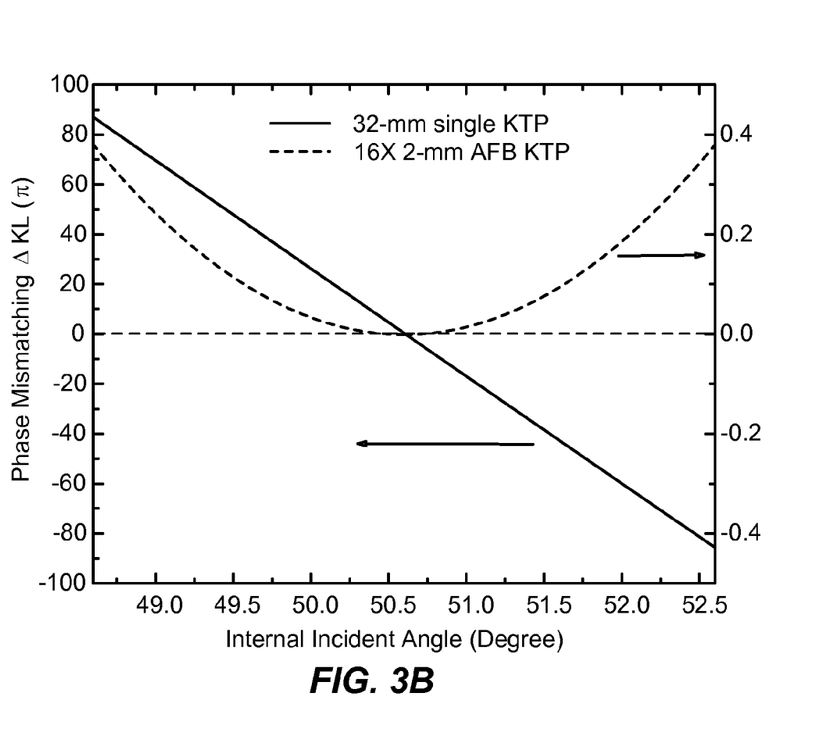
FIG. 3B shows comparison of total phase-mismatching in a 32-mm single KTP crystal and the 16-layer KTP composite.

Therefore, the angle acceptance of a N-layer bonded KTP composite will be N times broader than a single crystal device for the same interaction length. As a comparison, we have plotted the normalized DFG conversion efficiency as a function of the incident angle in FIG. 3(a) for a 32-mm single KTP crystal and for the 16-layer KTP composite. For the single KTP, the calculated angle acceptance for full-width at half-maximum (FWHM) is 0.04°. For the 16-layer AFB KTP, the acceptance angle increases to 0.64° as expected (increasing by 16 times). One can see that the normalized conversion efficiency curves that are calculated based on Eq. (1) and Eq. (2) are almost identical, which indicates our assumption of $\Delta k_1 = -\Delta k_2$ can be well satisfied in a quite large angle range. In fact, we have also calculated the total phase-mismatching as a function of the incident angle and plotted the results in FIG. 3(b). One can see that the phase-mismatching in a single KTP crystal is almost linearly dependent on the incident angle. Our calculation shows even at an angle deviation of 2°, the difference (that defined as $|\Delta k_1| - |\Delta k_2|)/(|\Delta k_1| + |\Delta k_2|)$) between $\Delta k_1$ and $\Delta k_2$ will be only about 0.05%.

As a trade-off for the wide angle acceptance and low spatial walk-off, the 16-layer KTP will lose the angle tunability for the output wavelengths due to the opposite incident angle changes in the adjacent KTP layers. However, similar as a noncritical-phase-matching (NCPM), the OPO output wavelengths can be temperature tuned. From the above calculations and comparisons, one can see that the 16-layer KTP composite actually becomes QNCPM for the OPO process. It has all the NCPM features such as walk-off corrected, insensitive to slight angle misalignment and the need to be tuned by temperature.

Bonding Configurations

Figure 4:
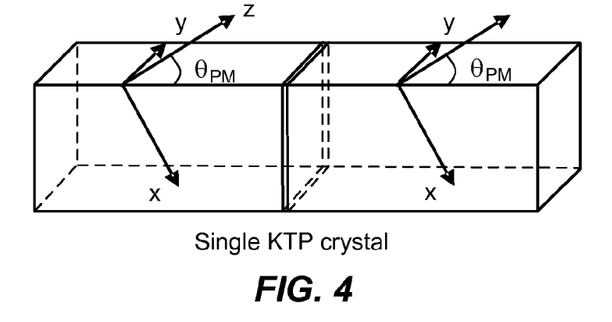
FIG. 4 shows bonding configurations of same oriented KTP crystals for walk-off correction with FIG. 4A showing the same signs of effective nonlinear coefficient and FIG. 4B showing opposite signs of effective nonlinear coefficient in the adjacent bonding layers.
Figure 4A:
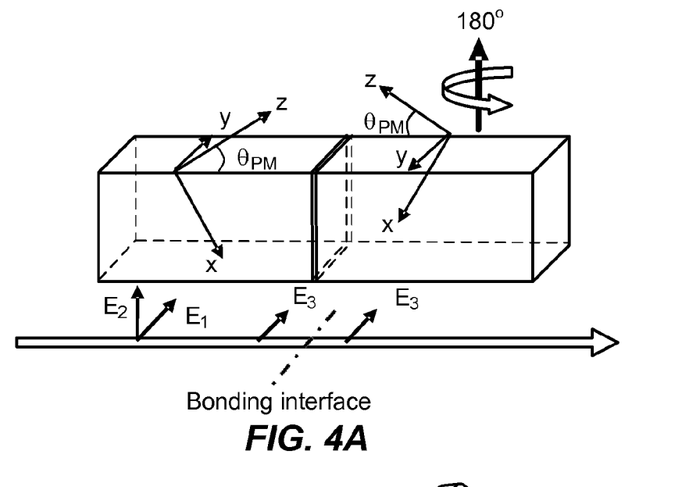
Figure 4B:
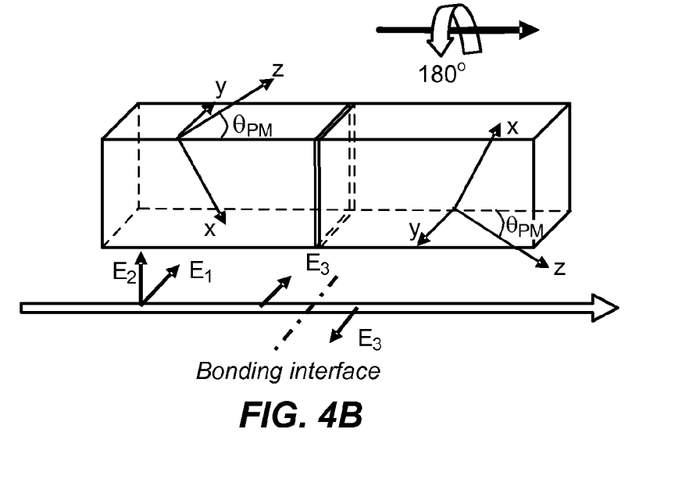

For the KTP crystal, in certain aspects, there are two bonding configurations between the same oriented KTP crystals for walk-off correction as shown in FIG. 4. According to the nonlinear susceptibility tensor of KTP crystal, one may find out that only the bonding configuration with z-directions head-to-head as shown in FIG. 4(a) can keep all the KTP layers with the same sign for the effective nonlinear coefficient $d_{eff}$. If the KTP layers are bonded head-to-end for the z-directions as shown in FIG. 4(b), the adjacent KTP layers will have opposite signs for $d_{eff}$. In this case the amplitude of the DFG field will be changed to:

$$A_3 = \frac{4\pi d_{eff} A_1 A_2}{n_3 \lambda_3} \left[ \frac{1}{\Delta k_1}(e^{i\Delta k_1 l} - 1) \sum_{n=1,3,5,\ldots}^{N-1} e^{\frac{n-1}{2}i(\Delta k_1 + \Delta k_2)l} - \frac{1}{\Delta k_2}(e^{i(\Delta k_1 + \Delta k_2)l} - e^{i\Delta k_2 l}) \sum_{n=2,4,6,\ldots}^{N} e^{\frac{n-2}{2}i(\Delta k_1 + \Delta k_2)l} \right] \quad (3)$$

Figure 5:
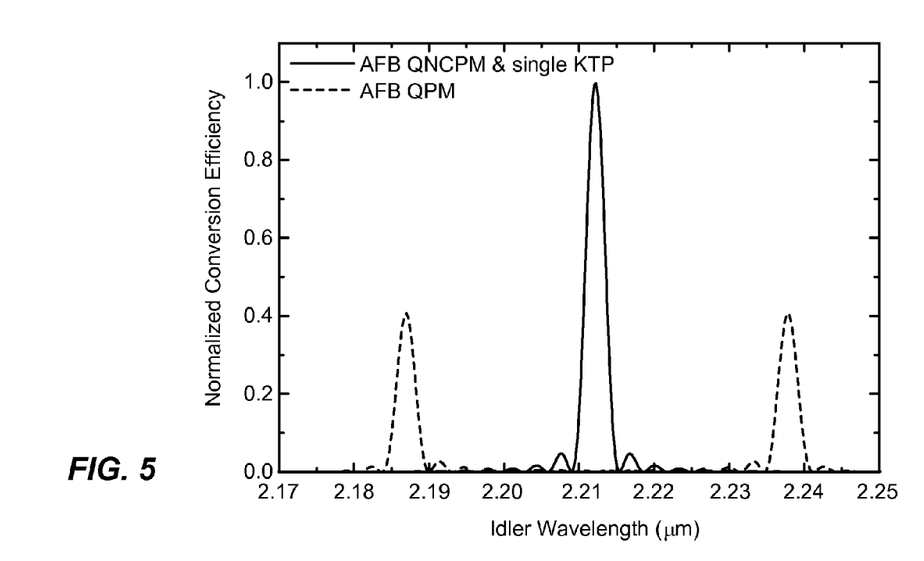
FIG. 5 shows OPO output wavelengths (idler) for QNCPM KTP and contra-phase matched KTP composites.

One can see that the original phase-matched wavelengths in the single KTP crystal become non-phase-matched due to the cancellation of the DFG field in the adjacent layers. However, same as in periodically-poled nonlinear devices, if the non-phase-matched wavelengths in the single KTP crystal which can satisfy $\Delta kl = \pm \pi$ in the bonding layers, the AFB composite then becomes contra-phase matched (or quasi-phase-matched (QPM)). The conversion efficiency at the contra-phase matched direction will be reduced by a factor of $(2/\pi)^2$ compared with the QNCPM device. In FIG. 5 we have plotted the OPO idler wavelengths for the two bonding configurations. One can see that there will be two closely spaced sets of contra-phase matched wavelengths for the idler (also for signal) beam in the AFB contra-phase matched KTP composite corresponding to $\Delta kl = +\pi$ and $-\pi$, respectively. Although the AFB contra-phase matched KTP has lower conversion efficiency compared with the QNCPM KTP, the contra-phase matched KTP may have advantages for intracavity THz generation. For example, in a Nd:YAG pumped periodically poled LiNbO$_3$ (PPLN) OPO in Ref. 13, the THz radiation was generated by the DFG between the OPO signal and idler in a periodically bonded GaAs crystal. The OPO must work at a near degeneracy condition to generate two close pump frequencies for the DFG process. That is to say for a 1.064 μm pumped OPO, the pump wavelengths for the THz generation must be around 2.128 μm. However, for the contra-phase matched OPO, one can use the two idler (or signal) outputs as pump wavelengths for the THz generation. The pump wavelengths can be chosen freely based on the best efficiency for OPO and THz converting. More importantly, in the PPLN OPO although the THz power was increased by more than 21 times in a doubly resonant oscillator (DRO) compared with in a singly resonant oscillator (SRO), the DRO is actually unstable and a complicated technique need to be used to prevent the backward conversion in the PPLN crystal (when the signal and idler beams travel back to the PPLN crystal). For the contra-phase matched OPO, both the pump beams can be resonated for high pump intensities while the OPO still works at a stable SRO mode. Moreover, no backward conversion can happen between the two resonated idler (or signal) beams in the contra-phase matched composite.

Bonding Orientations for ZGP Crystal

Figure 6:
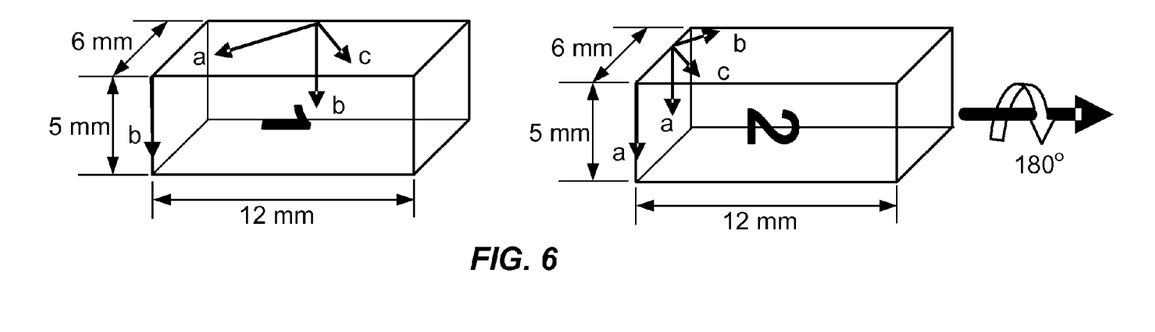
FIG. 6 shows a pair of ZGP
Figure 7:
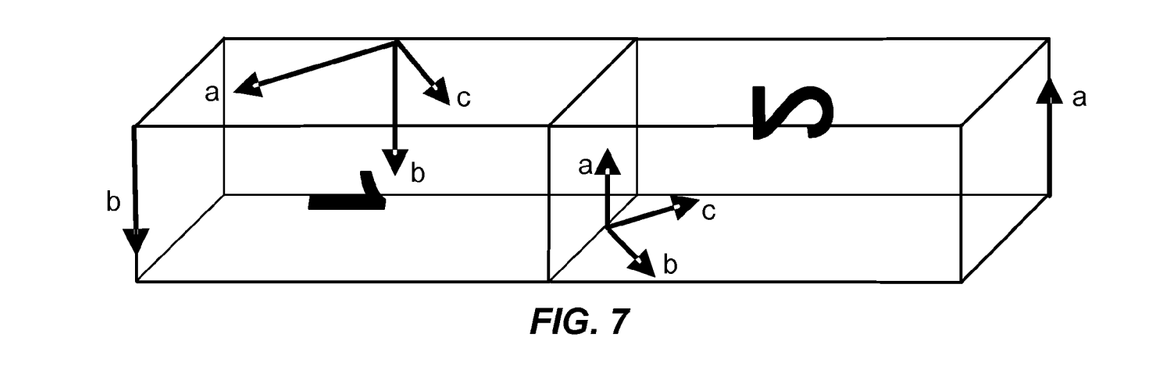
FIG. 7 shows the ZGP pair out of the boule. For walk-off correction, Crystal 2 needs to be rotated by 180° around one of the 12-mm long edges.

The following designs are examples for the bonding arrangement in ZGP crystals for quasi-non-critical phase matched and contra-phase matched 4-μm OPO with pump wavelength at 2.097 μm. Different from the KTP crystal, same orientation crystals can only form contra-phase matched structures regardless of the two WOC alignments. In order to form QNCPM structures, the WOC pair need to be cut with the same θ angle but orthogonal φ angles, that is to say φ=0° for the first crystal and 90° for the second crystal as shown in FIGS. 6 and 7.

Crystal 1. Light propagates in a-c plane. Crystal cutting angles is 54.3° to c-axis and 35.7° to a-axis.

Crystal 2. Light propagates in b-c plane. Crystal cutting angles are 54.3° to c-axis and 35.7° to b-axis.

Experimental Results

Figure 8:
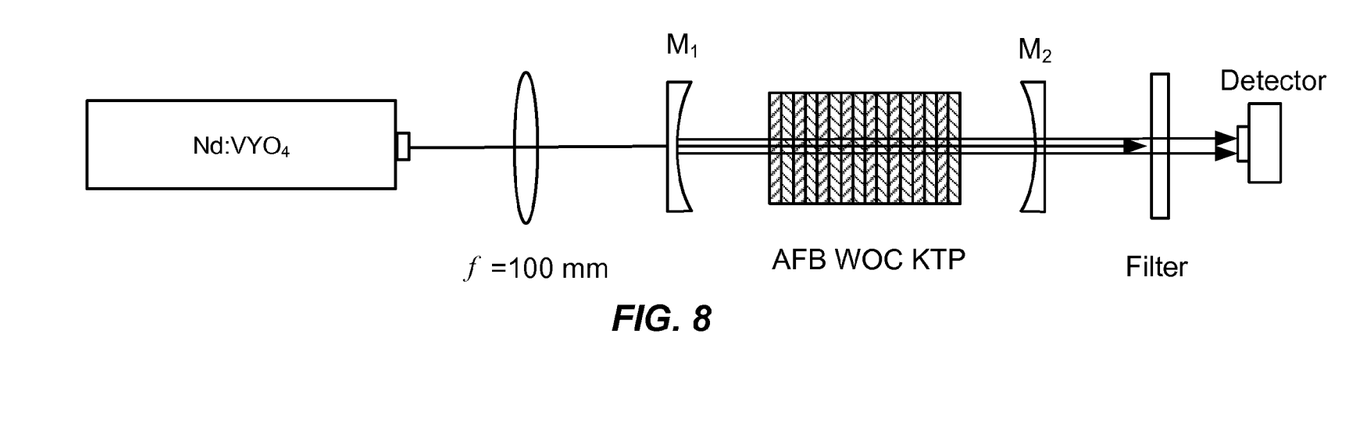
FIG. 8 is a schematic illustration of the OPO experimental setup.

The experimental setup has been shown in FIG. 8. The pump source used in the experiment is a 1.064-μm Nd:YVO$_4$ pulsed laser. The maximum pulse energy measured at the KTP surface is 523 μJ with pulse width of 15 ns at repetition rate of 1 KHz. The OPO resonator consists of two concave mirrors that both have the radius of curvature of 50 mm. The pump mirror has T=89% at 1.064 μm and R=99.5% for both signal and idler wavelengths. The output coupler (OC) has R=80% for the OPO wavelengths. The pump beam is focused on to the composite by a focus lens with f=100 mm. The pump beam waist measured inside the OPO cavity is about 110 μm.

Figure 9A:
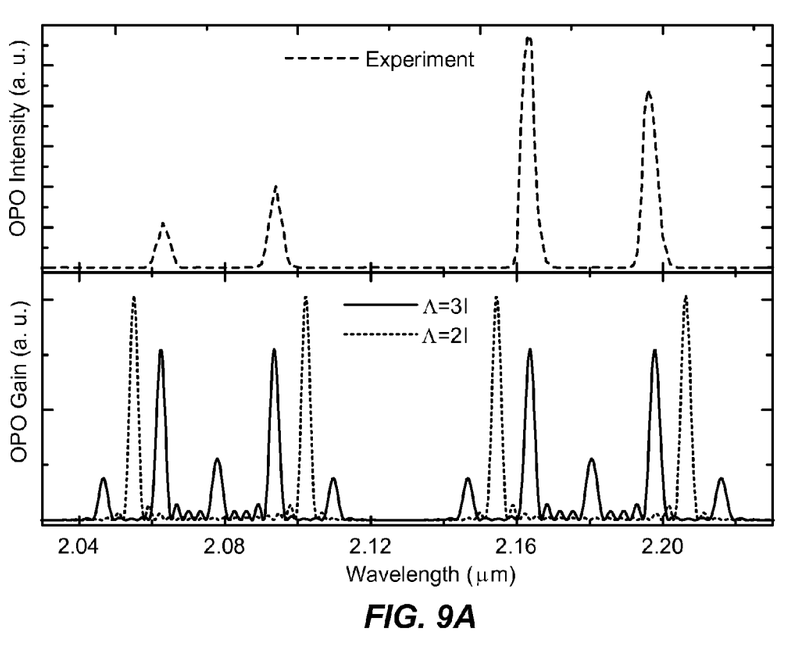

As expected for the contra-phase matched OPO in Sample 2, the output spectrum [the red curves in FIG. 9(a)] consists of two closely spaced signal and idler wavelengths at 2.063, 2.094, and 2.163, 2.196 μm, respectively. The wavelength separation between the two idlers (or signals) is 33 nm that agrees with the space between the two strongest theoretical peaks. The second highest peaks (at 2.079 μm and 2.180 μm) in the theoretical curve (blue curve) are the residual phase-matching peaks of the bulk crystal at $\Delta kl = 0$ due to the 3-layer period arrangement. The other small side peaks [we only plotted two signal and two idler peaks in FIG. 9(a)] are due to high-order QPM. We do not observe those small theoretical peaks in our experiment because of the low pumping intensity used. The polarization measurement shows that the two signal beams (short wavelengths) are e-polarized and the two idler beams (long wavelengths), same as the pump beam, are o-polarized, which confirms that the OPO oscillations are type-II phase-matched.

Figure 10:
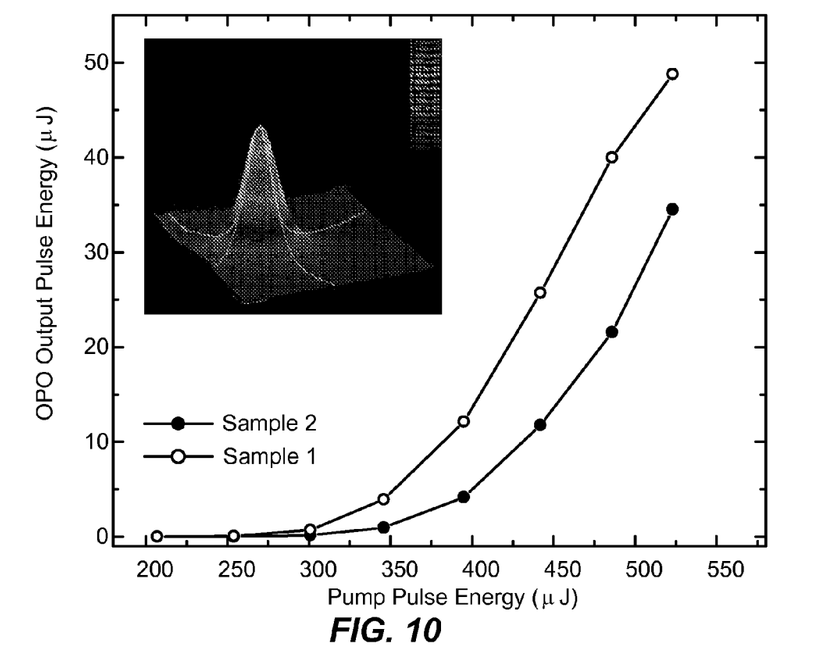
FIG. 10 shows output pulse energy as a function of pump pulse energy measured in Sample 1 (solid circles) and in Sample 2 (hollow circles) with 80% OC. The inserted figure is the output beam profile for the QNCPM OPO measured by a pyroelectric camera.

The OPO threshold for Sample 2 is measured around 254 µJ (44.6 MW/cm$^2$). The maximum pulse energy of 35 µJ has been achieved at pump pulse energy of 523 µJ. The corresponding conversion efficiency is 6.7% and the slope efficiency is around 25%, respectively (see FIG. 10). It is worth mentioning that the conversion efficiencies measured in our experiment are quite similar to the result measured in a 20-mm long single KTP OPO in Ref. [3], in which the OPO threshold is reported about 320 mJ/pulse (~151 MW/cm$^2$) and a maximum pump energy of 636 mJ/pulse was used.

Figure 9B:
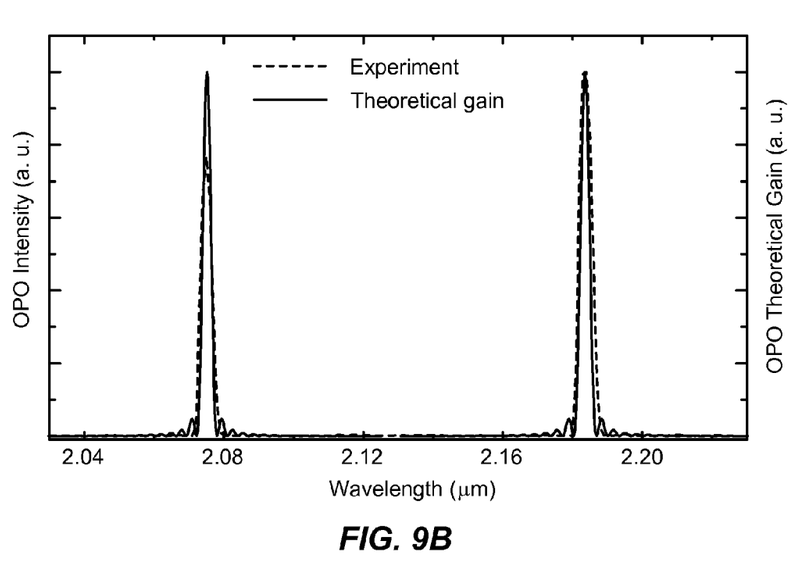

For QNCPM OPO in Sample 1, the maximum output pulse energy is measured to be 49 µJ. The corresponding conversion efficiency is 9.3% and the slope efficiency is around 27%, respectively. The OPO wavelengths are measured at 2.075 µm (e-polarized) and 2.184 µm (o-polarized) as shown in FIG. 9(b). Those OPO wavelengths and linewidths are the same as for the bulk KTP OPO and agree with our theoretical predictions. In FIG. 3 we have also inserted the OPO beam profile measured by a pyroelectric camera, where one can see that no obvious beam distortion or separation can be observed even though the OPO output includes both e- and o-polarized signal and idler beams.

Figure 11:
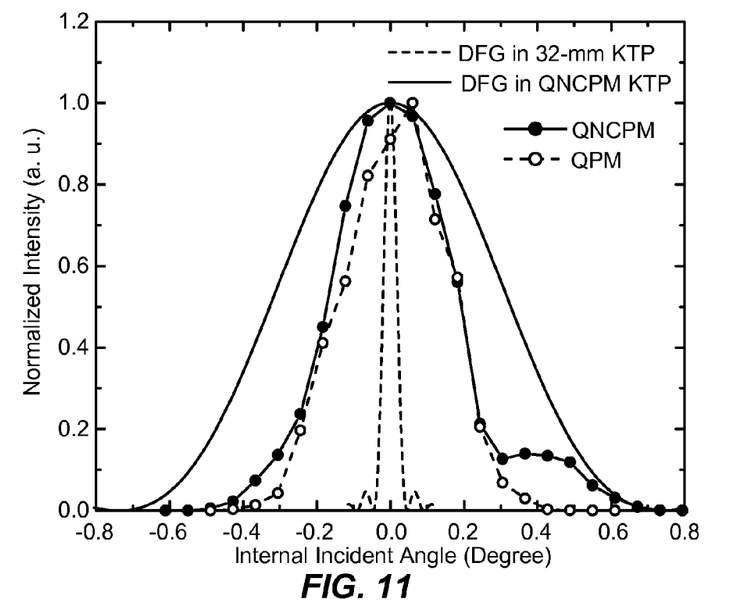
FIG. 11 shows normalized OPO intensity as a function of internal polar incident angle changes measure in Sample 1 (solid circles) and Sample 2 (hollow circles). Red and blue curves are theoretical phase-matching curves for the DFG process in a 32-mm long bulk KTP and WOC composite with 2-mm layer thickness, respectively.

The OPO output power as function of the internal incident angle in the θ direction has been plotted in FIG. 11. In both of the samples, no wavelength shift can be detected with the composite angle change. The measured angular acceptance (full-width at half-maximum) for the QNCPM and contra-phase matched OPO are 0.36° and 0.34°, respectively. Theoretically, the angular acceptance for the similar DFG process in a 32-mm single KTP crystal is only about 0.04°. If considering the threshold and gain requirements in the OPO process, the angular acceptances for the single KTP crystal will be further reduced. The above experimental results indicate that the WOC composites indeed have a much larger angular acceptance than a single KTP crystal, which confirm that the OPO oscillations achieved in our experiment have features that resemble NCPM.

Figure 12A:
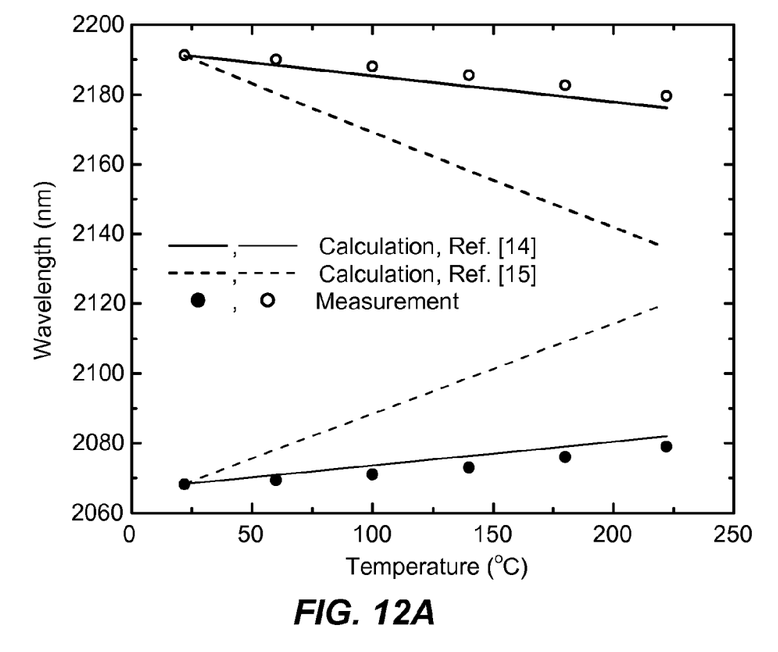
FIGS. 12A and 12B show OPO output wavelength as a function of temperature for QNCPM and contra-phase matched KTP composites, respectively.
Figure 12B:
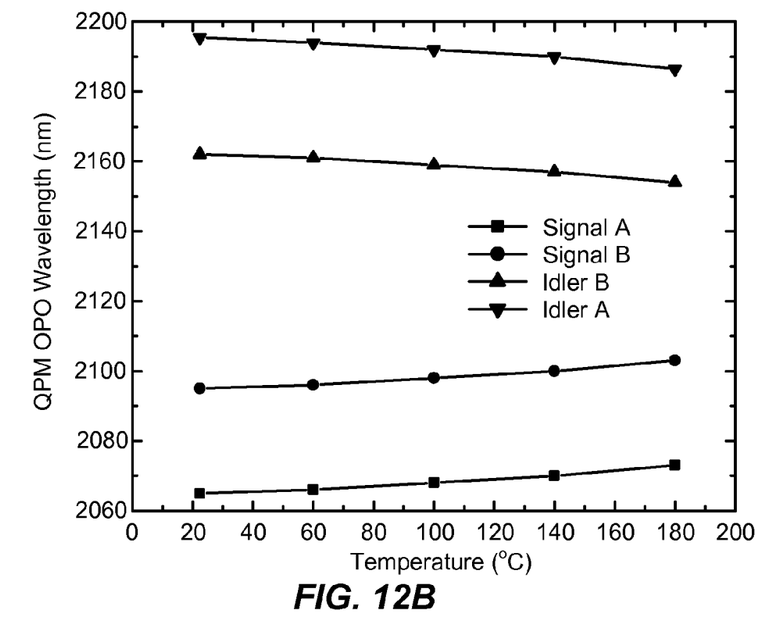

Since both the QNCPM and the contra-phase matched KTP composites have lost their angular tunability as a trade-off for the large angular acceptance, the OPO output wavelengths need to be temperature tuned. In FIG. 12(a) and (b), we have plotted the measured OPO output wavelength as function of sample temperature. The wavelength shift is about 8 nm toward the degenerated direction for all of the OPO output wavelengths when the temperature is changed from 22° C. to 222° C. We have also calculated the temperature tuning range by using the temperature-dependent Sellmeier equations from different sources [14,15] and plotted the calculations in FIG. 6(a). One can see that the most recent temperature-dependent Sellmeier equations measured by Kato [14] have the least wavelength deviation from our measured wavelength. Nevertheless, since most of the current temperature-dependent Sellmeier equations were fitted from the data that were measured at wavelengths below 1.6 µm [14,15], the temperature dispersion in the refractive indices at longer wavelengths need to be experimentally measured for accurate calculations of the temperature tuning range of the KTP OPOs.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A quasi non-critically phase matched optical assembly capable of correcting walk-off of an impinging radiation beam, comprising:
    at least one pair of nonlinear optical crystals, each individual crystal being critically phase matched and having a pair of opposing end faces, wherein the pair of crystals are cut from the same single crystal and have the same length between end faces, and wherein the crystals each have an identical cut of an end face relative to an optical axis of the single crystal,
    wherein the pair of crystals are bonded together to form a bonded pair that behaves as a quasi non-critically phase-matched optical assembly, and arranged with the same polarity of effective nonlinear coefficient in each crystal even though the crystal alignment may be different for different crystal symmetric groups and phase matching types, wherein the bonded pair corrects for walk-off of an impinging radiation beam that traverses the pair and provides increased angular acceptance of the impinging radiation beam relative to a single crystal.

2. The device of claim 1, wherein the single crystal is a frequency-converting biaxial crystal.

3. The device of claim 2, wherein the single crystal is a biaxial crystal selected from the group consisting of KTP (KTiPO$_4$), LiB$_3$O$_5$, KNbO$_3$, CsB$_3$O$_5$, BiB$_3$O$_6$, CsTiOAsO$_4$, and RbTiOAsO$_4$.

4. The device of claim 1, wherein the length of the pair of crystals is selected based on the specific walk-off angle, the input beam diameter, and conversion efficiency.

5. The device of claim 1, comprising multiple walk-off corrected crystal pairs cut from the same single crystal.

6. The device of claim 5, wherein a total length of all walk-off corrected crystal pairs is selected based on to the power of the input beam.

7. The device of claim 1, wherein the single crystal is a frequency-converting uniaxial crystal.

8. The device of claim 7, wherein the single crystal is a uniaxial crystal selected from the group consisting of ZGP (ZnGeP2), β-BaB$_2$O$_4$, CsLiB$_6$O$_{10}$, LiNbO$_3$, MgO:LiNbO$_3$, AgGaS$_2$, and AgGaSe$_2$.

9. A quasi non-critically phase matched optical assembly capable of correcting walk-off of an impinging radiation beam, comprising:
    at least one pair of nonlinear optical (NLO) crystals, each individual crystal being critically phase matched and having a pair of opposing end faces, wherein the pair of crystals are cut from the same single crystal and have the same length between end faces where the single crystal length in the pair is shorter than the crystal aperture length that is defined as $l_a=2\omega_0/\tan(\rho)$, where $\omega_0$ is the pump beam waist inside the pair, ρ is the walk-off angle, and where the single crystal length in the pair has an angular acceptance bandwidth defined as $1<\Delta\theta_B/\Theta$, where $\Delta\theta_B=1.772\cdot\pi\cdot(\partial\Delta k/\partial\Delta\theta)^{-1}$ is the NLO crystal angular full bandwidth in radian·centimeter, Θ is the divergence full angle of the pump beam in radian, and wherein the crystals each have an identical cut of an end face relative to an optical axis of the single crystal,
    wherein the pair of crystals are bonded together to form a bonded pair that behaves as a quasi non-critically phase-matched optical assembly, and arranged with the same polarity of effective nonlinear coefficient in each crystal even though the crystal alignment may be different for different crystal symmetric groups and phase matching types.

* * * * *